(12) United States Patent
Sherry et al.

(10) Patent No.: US 6,870,490 B2
(45) Date of Patent: Mar. 22, 2005

(54) DISPLAY OF ALTITUDE AND PATH CAPTURE TRAJECTORIES

(75) Inventors: Lance C. Sherry, Fairfax, VA (US); Steven T. Quarry, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 116 days.

(21) Appl. No.: 09/935,803

(22) Filed: Aug. 23, 2001

(65) Prior Publication Data

US 2003/0058134 A1 Mar. 27, 2003

(51) Int. Cl.⁷ .................................................. G08B 23/00
(52) U.S. Cl. ....................... 340/970; 244/181; 340/973; 340/977; 701/4; 701/11; 701/120
(58) Field of Search ................................. 340/970, 973, 340/974, 975, 976, 977, 980; 701/4, 5, 9, 11, 14, 17, 18, 120; 244/180, 181, 182, 183, 186, 187, 192, 193

(56) References Cited

U.S. PATENT DOCUMENTS

| | | | |
|---|---|---|---|
| 4,536,843 A | 8/1985 | Lambregts | |
| 4,862,372 A | 8/1989 | Appleford | |
| 5,412,382 A | 5/1995 | Leard et al. | 340/974 |
| 5,420,582 A | 5/1995 | Kubbat et al. | 340/974 |
| 5,523,949 A | 6/1996 | Agate et al. | |
| 6,085,129 A | 7/2000 | Schardt et al. | 701/14 |
| 6,175,315 B1 * | 1/2001 | Millard et al. | 340/959 |
| 6,188,937 B1 | 2/2001 | Sherry et al. | 701/14 |
| 6,441,751 B2 | 8/2002 | Berlioz et al. | 340/977 |
| 2001/0002817 A1 | 6/2001 | Berlioz | |

* cited by examiner

*Primary Examiner*—Brent A. Swarthout

(57) ABSTRACT

Pilot error is reduced and auto pilot operation is improved by the addition of capture information to the information provided on a cockpit display. The capture information, such as, for example, capture start point, last point to initiate capture, trajectory during capture, and capture overshoot region provide information to the pilot regarding the correct initiation of capture. Pilots are therefore better able to evaluate the ongoing performance of the automation or auto pilot systems and to trust that the auto pilot is functioning as desired. Furthermore, the pilot operating the aircraft in manual mode receives guidance based on this information to better know when to initiate capture of the assigned altitude or vertical path.

31 Claims, 19 Drawing Sheets

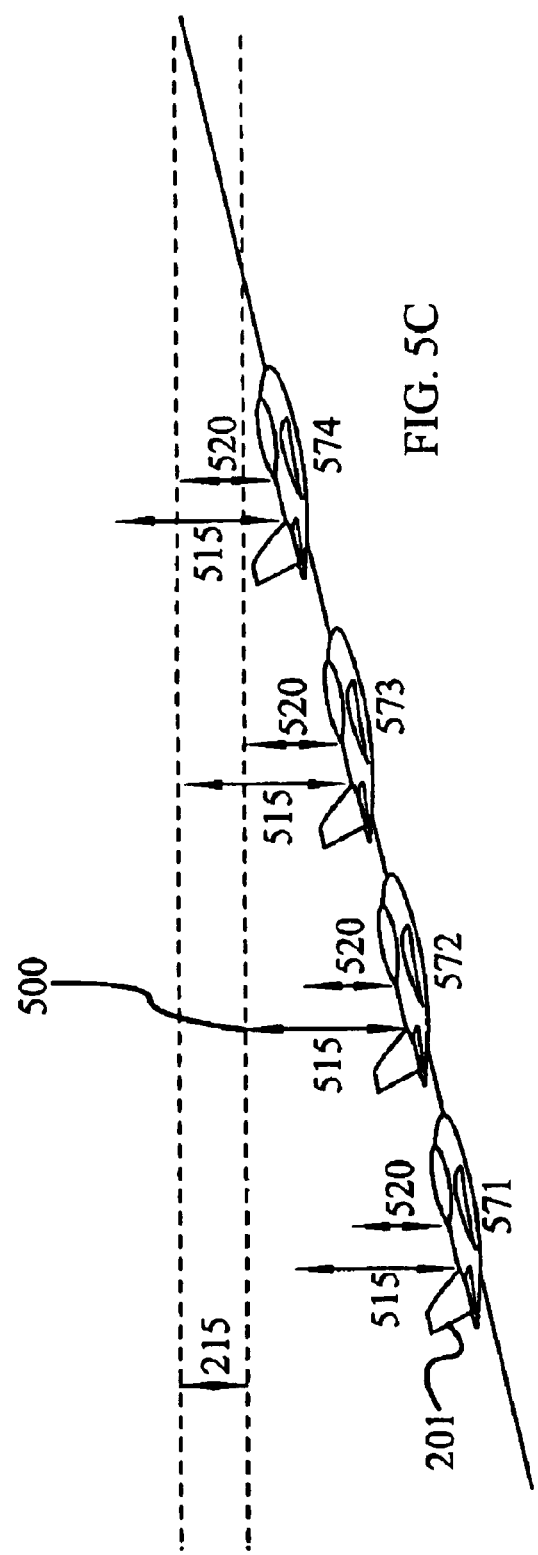

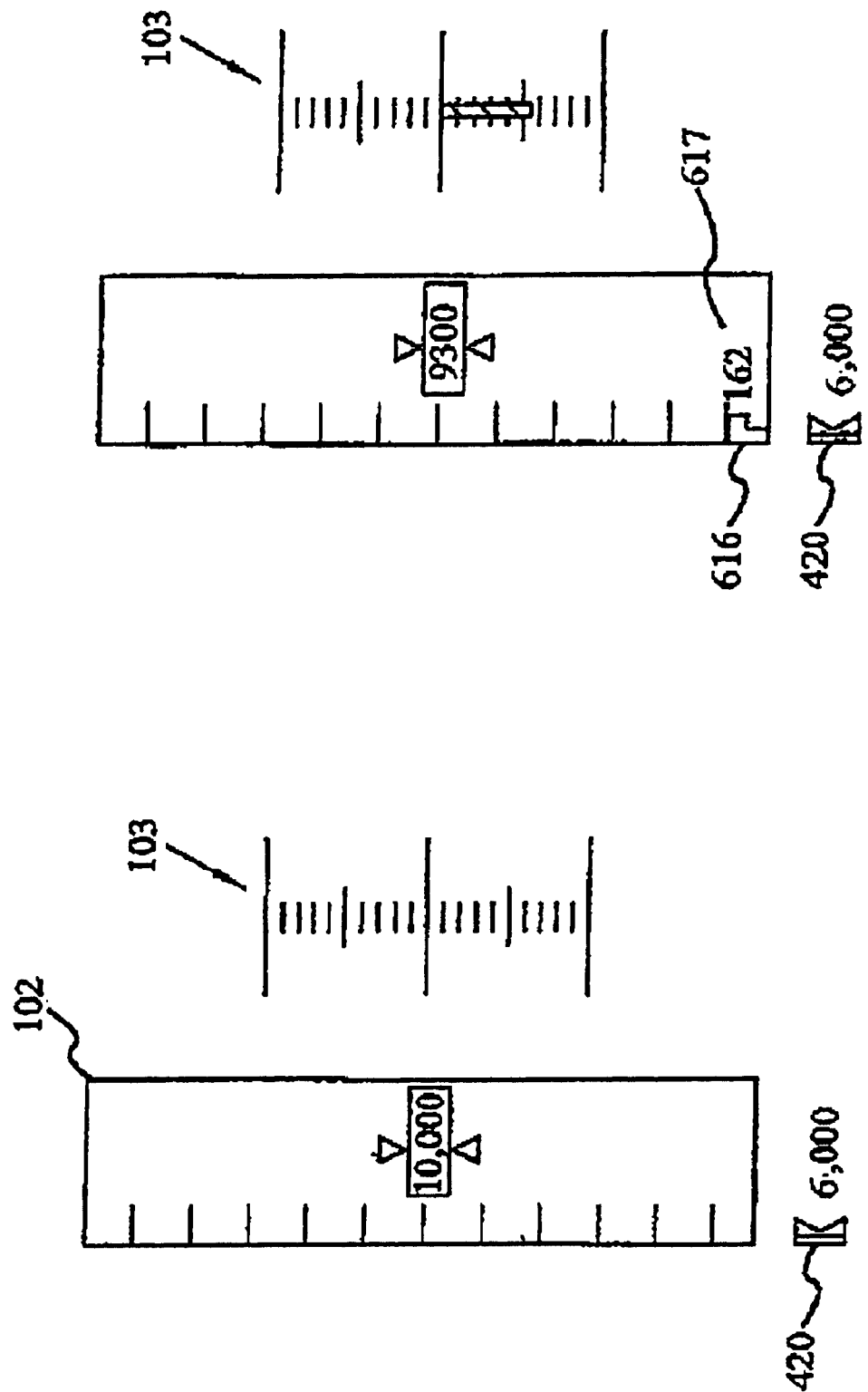

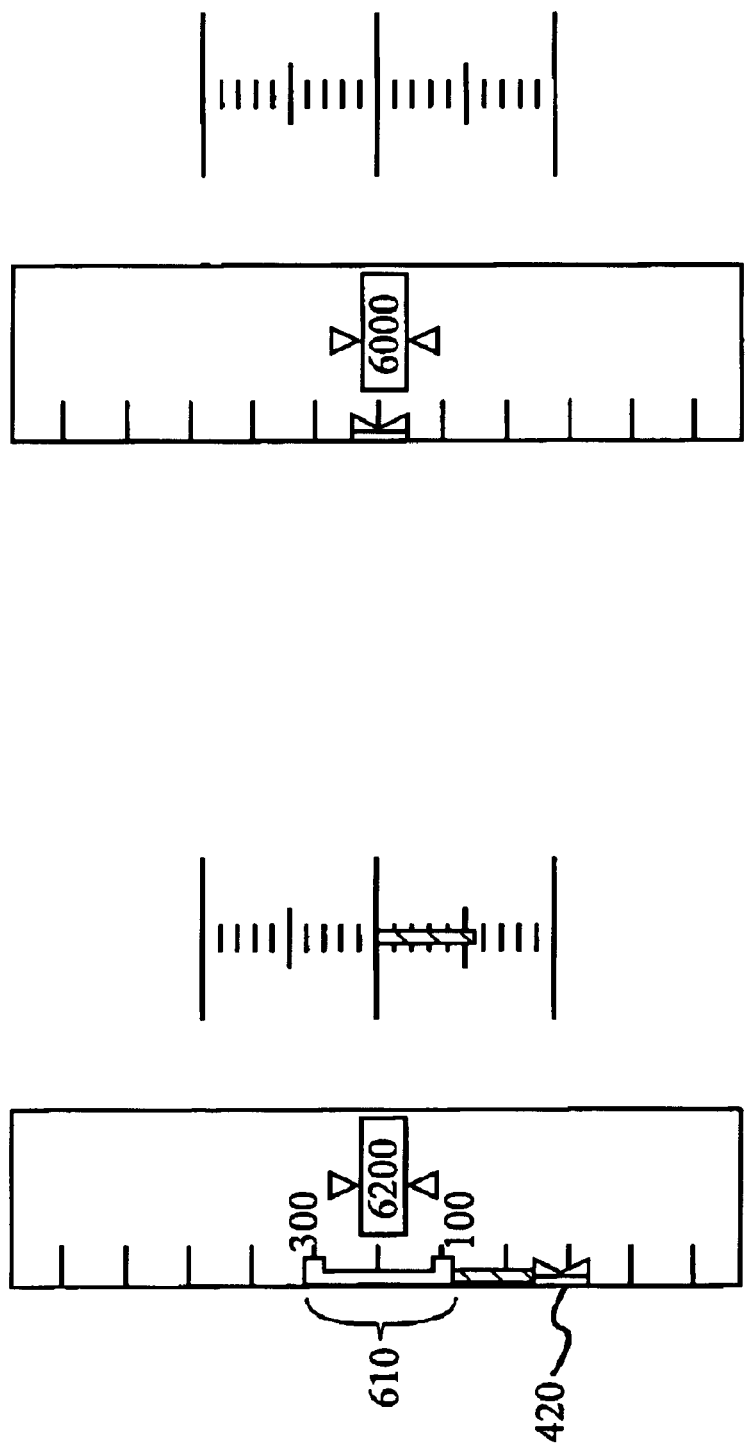

DISPLAY OF ALTITUDE AND PATH CAPTURE TRAJECTORIES

FIELD OF THE INVENTION

This invention relates generally to aircraft flight instrument systems and, more particularly, to methods and apparatus for displaying altitude and path capture trajectories to an aircraft pilot.

BACKGROUND OF THE INVENTION

Air traffic control systems and procedures are designed to reduce the likelihood that aircraft will collide with each other or with objects on the ground. To this end, air traffic controllers (ATC) typically assign specific flight paths to aircraft which, if adhered to, are designed to keep individual aircraft in their own lanes. These paths may be constant altitude paths, or the paths may be assigned paths (e.g., three dimensional directions from one point in space to another point in space, including level paths, ascending paths and descending paths).

During a typical flight, an aircraft may be assigned to a new altitude, and may begin an ascent or descent to that altitude. The aircraft achieves the assigned altitude once it is steadily flying at the new assigned altitude. At some point before the aircraft achieves the assigned altitude, an adjustment to the pitch and thrust is typically made to effect a smooth transition from the ascent/descent maneuver to the constant altitude portion of the flight. Initiating the adjustment(s) to the pitch and thrust is known as initiating the "capture" of the assigned altitude. If capture of the assigned altitude is delayed, the aircraft may either overshoot the assigned altitude or perform a rough transition to the constant altitude portion of the flight. Either of these conditions may potentially create an unsafe condition as the aircraft could enter into airspace for which it has not received ATC clearance. An overshoot of the assigned altitude by greater than, for example, 250 feet, is known as a "bust" or "altitude bust" and is a violation of Federal Aviation Administration rules.

During a maneuver to an assigned altitude or vertical path, a pilot typically receives feedback regarding the altitude, thrust, heading, rate of ascent, and other information from a primary flight display panel. Modern day flight display panels are typically electronic, as opposed to analog indicators such as dials and gauges. These electronic displays may be, for example, flat screens or computer monitors. In particular, the display screens often show an altitude tape indicating the current altitude and another indicator on the screen may show the rate of ascent or descent. However, these indicators do not typically display information regarding when capture of the assigned altitude should begin, the path that should be taken to acquire the assigned altitude, or the last point to begin capture without an altitude bust.

Often, aircraft are equipped with flight management systems, auto pilots, and other automated flight control systems. These systems typically control the aircraft to relieve the pilot of repetitive tasks such as instantaneous aircraft trajectory control. Moreover, the automation is also typically capable of performing these tasks consistently with better accuracy than manual pilot operation. A pilot typically conveys the assigned altitude or assigned path to the automation (e.g., auto pilot) via a mode control panel, a multi-function control and display unit (MCDU), or like electronic systems. The automation then typically controls the aircraft's pitch and thrust to achieve the pilot's instructions. Alternatively, the pilot may manually control the aircraft's pitch and thrust to fly the plane along an assigned path.

An aircraft guided by automatic pilot typically accurately processes the many changing variables such as wind speed, thrust, pitch, positioning of control surfaces, and weight of the aircraft to determine and follow a path which smoothly transitions from the ascent/descent phase to the level flight phase or, in general, from one phase to another phase. Performing this same task under manual control is difficult because no "rules of thumb" or bright line tests are available to assist the pilot in accounting for all of these factors. Aircraft pilots often closely monitor the performance of the auto pilot and are prepared to make corrections if necessary. It is important, therefore, that the pilot is provided accurate and timely information allowing the pilot to make informed decisions, make more efficient use of the automation, and make fewer pilot errors.

When an aircraft experiences an altitude bust by overshooting a target altitude by, for example, 250 feet, the incident must typically be reported to the FAA or other regulatory body. Several recent Safety Reports (e.g., NTSB-A-99-39 to -44, 1999) and Aviation Safety Reporting System ("ASRS") Reports indicated that a contributing factor to described incidents and accidents was the pilot's lack of knowledge of the trajectory used by the auto-pilot to capture the assigned altitude. Several researchers have also identified situations in which the pilots were not aware of the capture trajectory commanded by the automation.

The continued advancement in the sophistication of aircraft flight displays has resulted in increasingly higher levels of information density which has presented a greater amount of visual information to be perceived and understood by the aircraft operator. In many applications, it is important that visual displays provide a proper cognitive mapping between what the operator is trying to achieve and the information available to accomplish the task. As a result, such systems increasingly utilize the human-factor design principles in order to build instrumentation and controls that work cooperatively with human operators. More particularly, Title 14 of the U.S. Code of Federal Regulations, Federal Aviation Regulations (FAR) Part 25, Sec. 25.1321 et seq. provides guidelines for the arrangement and visibility of instruments, warning lights, indicators, and the like. Similarly, detailed guidelines related to electronics displays can be found in FAA Advisory circular 20–88A, Guidelines on the Marking of Aircraft Powerplant Instruments (September 1985). Both of these documents are incorporated herein by reference in their entirety as background information.

Current display information may be improved to assist pilots in determining when capture initiation should begin. Therefore, a need exists for a method and apparatus to display FMS ("Flight Management System"), auto pilot, and other flight control system calculated capture initiation information to a pilot to reduce pilot errors.

BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

According to various aspects, a method for providing feedback to a vehicle operator suitably includes providing an indicator of current vehicle position, adjusting this indicator in real time, assigning a target position to be captured and calculating a first capture initiation position such that capture can be accomplished if capture is initiated at this first capture initiation position, and displaying this first capture position relative to the target or to the current position.

According to another aspect of the present invention, information is provided to a pilot of an aircraft via a display. The display indicates the current attribute of the aircraft, receives a target attribute for the aircraft, and determines a capture attribute for the aircraft to obtain the target attribute from the current position. Then the capture attribute is displayed in conjunction with the current attribute of the aircraft.

According to another aspect of the present invention, a target altitude indicator and a current altitude indicator are shown on a sliding scale altitude indicator on a display for an aircraft. A capture region indicator and an overshoot region indicator are also shown on the sliding scale altitude indicator.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

A more complete understanding may be derived by referring to the following detailed description and claims when considered in connection with the following illustrative figures where like numerals denote like elements.

FIGS. 5A–5C are exemplary depictions of an aircraft ascending to an assigned altitude or target;

FIGS. 8A–8F are an exemplary embodiment of an altitude tape as shown in various steps during the acquisition of an assigned altitude.

DETAILED DESCRIPTION

Various aspects of the present invention may be described herein in terms of functional block components and various processing steps. It should be appreciated that such functional blocks may be realized by any number of hardware and/or software components or computer systems configured to perform the specified functions. For example, one or more components may employ various computer systems, e.g., microprocessor or micro controller—based systems, and the like, which may carry out a variety of functions under the control of one or more microprocessors or other control devices. Similarly, the software elements of the present invention may be implemented with any programming or scripting languages such as C, C++, Java, Assembly Language, PERL, or the like, or any combination thereof, with the various algorithms being implemented with any combination of data structures, objects, processes, routines or other programming elements. Further, it should be noted that various elements may employ any number of techniques for data transmission, signaling, data processing, and the like. Also, the software elements of the present invention may be stored on any digital medium such as a disk, CD-ROM, optical storage device, magnetic storage device, memory, or other data storage medium.

It should be appreciated that the particular implementations shown and described herein are illustrative of exemplary embodiments, and are not intended to limit the scope of the invention in any way. Indeed, for the sake of brevity, conventional flight display devices and other functional aspects of the systems (and components of the individual operating components of the systems) may not be described in detail. Furthermore, the connecting lines shown in the various figures contained herein are intended to represent exemplary functional relationships and/or physical or logical couplings between the various elements. It should be noted that many alternative or additional functional relationships, physical connections or logical connections may be present in a practical altitude and path capture trajectory displaying system.

Figure 1A:
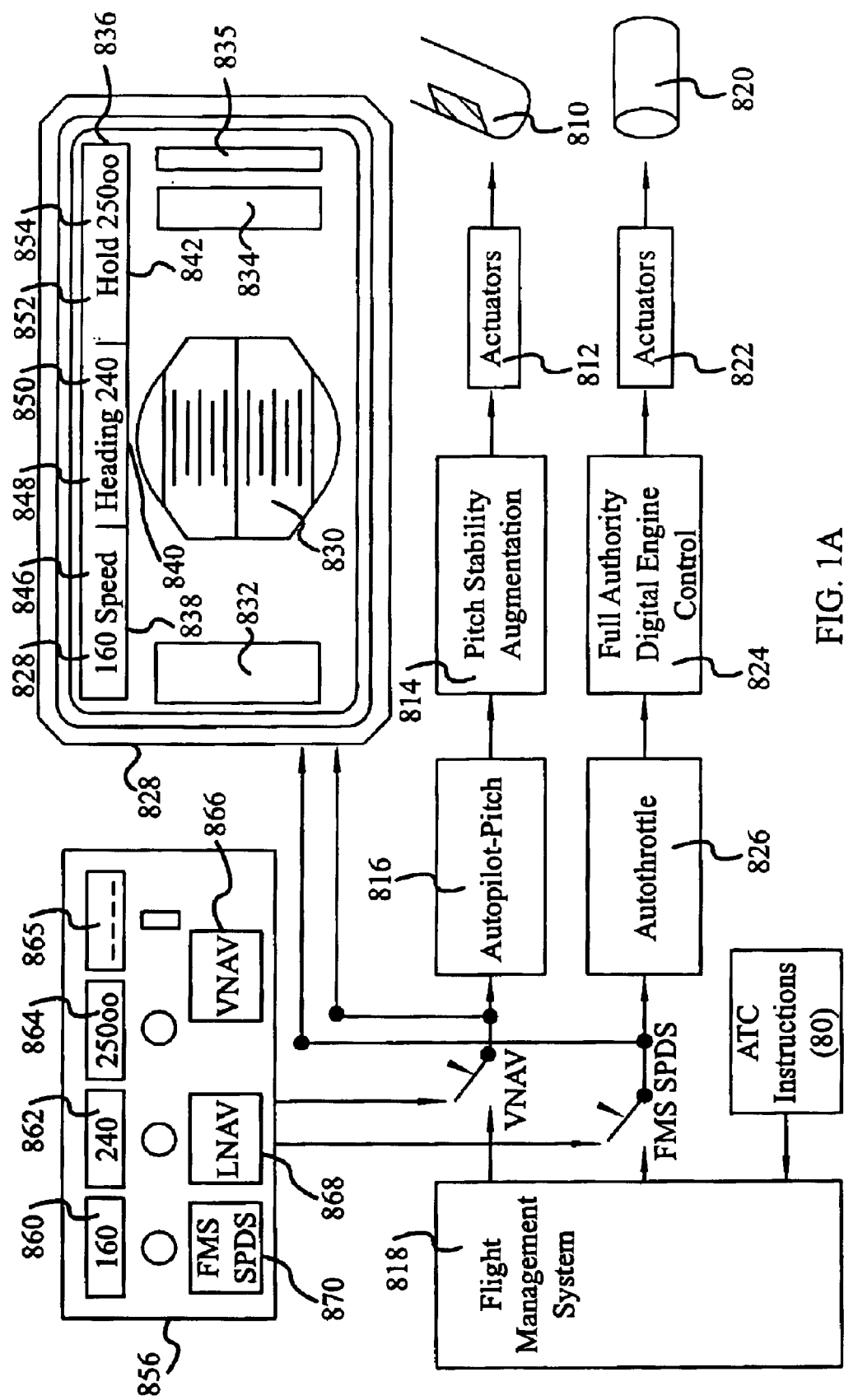
FIG. 1A is an exemplary embodiment of a flight management system and auto pilot system with a primary flight display.
Figure 1B:
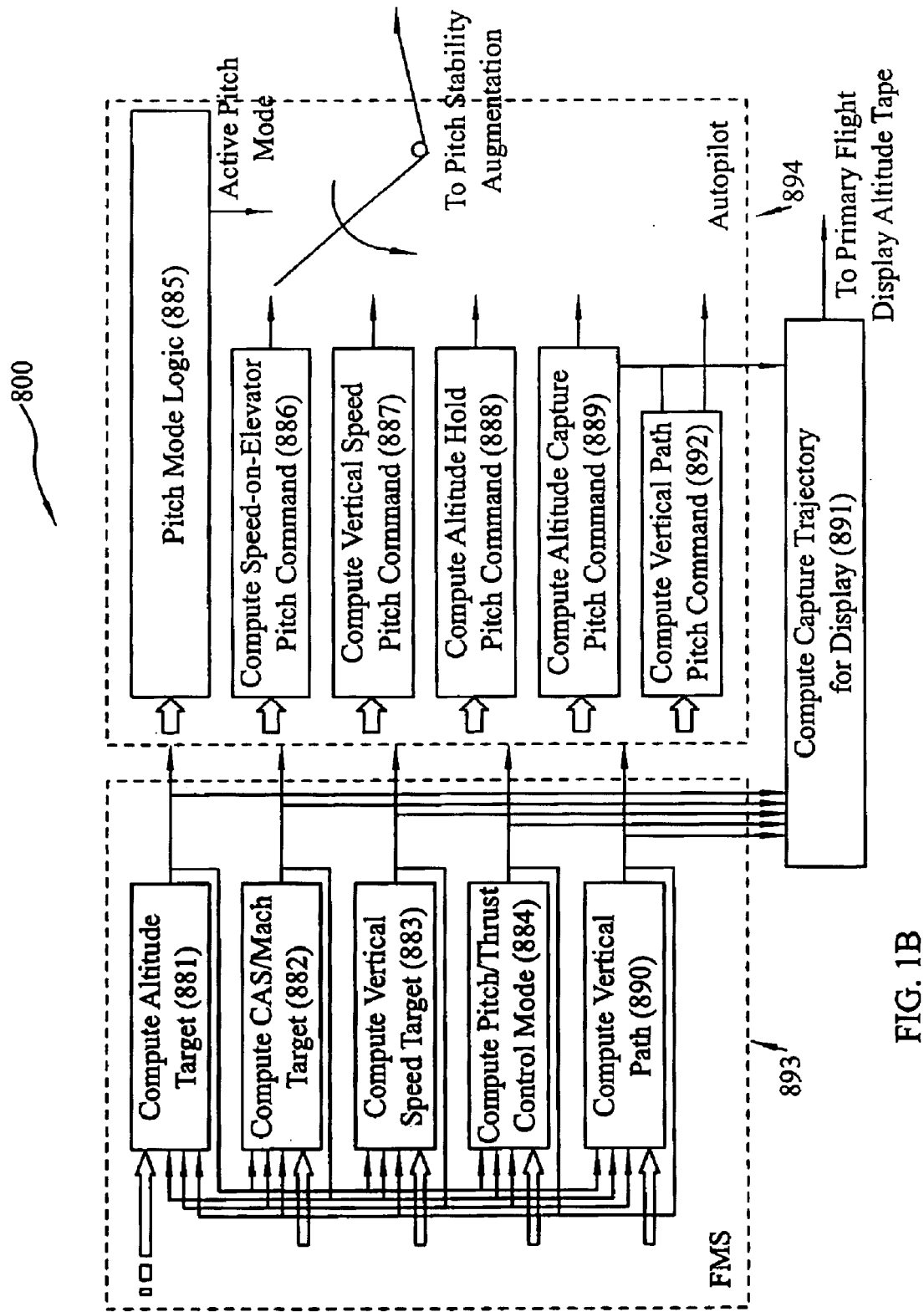
FIG. 1B is a functional block diagram showing an exemplary embodiment of the present invention.

FIGS. 1A and 1B show how various embodiments may connect to and communicate with systems of an aircraft. Referring to FIG. 1A, a block diagram of a typical aircraft vertical axis guidance and control system is shown. The vertical profile of an aircraft may be considered as having two dimensions altitude (up/down) and time (speed). The vertical profile of the aircraft may be controlled via elevators 810 and engines 820 which control the pitch (up/down) component and the thrust component respectively.

With respect to the first of these components, an elevator 810 of an aircraft may be driven by an actuator 812 via a link. This link may be electric, hydraulic, mechanical, or any other linkage assembly. Actuator 812 in turn may be driven by a Pitch Stability Augmentation System (PSAS) 814. PSAS 814 accounts for non-linearities in the actuators 812 and instabilities in the aircraft dynamics. An Autopilot 816 may be coupled to PSAS 814 and may generate command signals. Autopilot 816 may be driven by electronic signals (targets and control modes) from Flight Management System (FMS) 818 or any other automated flight plan guidance system.

With respect to the second component, the thrust (T) of the engine 820 may also driven by an actuator 822 which in turn may be driven by a Full Authority Digital Electronic Controller (FADEC) 824. An auto-throttle 826 may generate an electronic signal (throttle command) which is communicated to FADEC 824. Auto-throttle 826 receives signals from FMS 818, or any other automated flight plan guidance system that generates throttle commands.

Mode Control Panel (MCP) 856 serves as a user-interface between the flight-crew and the automation. The flight-crew select pitch, thrust, and roll modes via 860, 862, 864, 865, 866, 868, and 870, respectively.

The primary flight display 828 may also be part of the user-interface between the flight-crew and automation. The primary flight display 828 may include an attitude and roll indicator 830, speed tape 832, altitude tape 834, and vertical rate indicator 835 along with any other appropriate displays. The primary flight display may also include a Flight Mode Annunciator (FMA) 836. The FMA, in one embodiment, includes one panel for autothrottle 838, one panel for roll autopilot 840, and one panel for pitch autopilot 842. The autothrottle panel annunciates (i.e., displays) the speed target 828 and the autothrottle control mode 846. The roll panel 840 annunciates the heading/track target 848 and the heading/track control mode 850. The pitch panel annunciates the altitude target 854 and the pitch control mode 852. The FMA 836 annunciates the targets from the MCP 856 and the control modes from the MCP 856. The pilot selections are displayed on the FMA 836.

The flight-crew may opt to allow FMS 818 to automatically select pitch modes and altitude targets by selecting VNAV or PROF button 866. The flight-crew may also opt to have the FMS 818 automatically select the thrust modes and speed targets by selecting the FMS SPDS button 870. Autopilot 816 and FMS 818, in one embodiment, employ processes and decision-making algorithms that compute a constant vertical acceleration trajectory (a circular path trajectory) to the assigned altitude when the Autopilot 816 is engaged or when VNAV 866 is engaged. When the Autopilot and/or VNAV are engaged, the flight-crew generally monitor the behavior of the automation and the trajectory of the aircraft. PFD 828 is the primary source of information on aircraft attitude, roll 830, speed 832, and altitude 834. Capture of the assigned altitude may be annunciated by a change in the FMA 836. Due to the non-linear equation used to perform a constant g, circular path capture computed by the Autopilot 816 and/or FMS 818, it is often very difficult for the pilot to use rules-of-thumb or heuristics to predict the capture trajectory or to monitor its execution.

Referring to FIG. 1B there is shown a generalized block diagram of one exemplary embodiment of a system 800 for computing and displaying a capture region. System 800 has the ability to compute various real time values regarding the flying of the aircraft. These values include the altitude target, CAS/Mach target, vertical speed target, and pitch/thrust control mode. These values may then be provided to an auto pilot system 894 or other similar system, and may be used to compute capture trajectories for display. In an exemplary embodiment, an FMS 893, or another similar component or components, includes five processes. These processes include decision-making algorithms 881, 882, 883, and 884 which respectively compute the altitude target, CAS/Mach target, vertical speed target, and pitch/thrust control mode. Algorithm 890, which may execute within FMS 893, suitably receives input from some or all of these processes and computes the desired vertical path. The computed vertical path may also provided to auto pilot system 894 and to a process for computing the capture trajectory 891.

The system 800 for computing and displaying a capture region may include processes for computing pitch commands. These pitch command computing processes may be executed, for example, as a part of an Autopilot system 894. In an exemplary embodiment, Auto pilot system 894 includes an Autopilot pitch mode logic 885 for determining which pitch command is used from among the outputs of the following processes: Compute Speed-on-Elevator Pitch Command 886, Compute Vertical Speed Pitch Command 887, Compute Altitude Hold Pitch Command 888, Compute Altitude Capture Pitch Command 889 and Compute Vertical Path Pitch Command 892. The selected pitch command is communicated to the pitch stability augmentation process.

The capture trajectory is computed based on data such as the assigned altitude and calculated altitude capture pitch commands. The overshoot range is also computed for display. In an exemplary embodiment, capture trajectory computation process 891 accepts trajectory computations from the assigned altitude computation process 890 and altitude capture pitch command computation process 889. Capture trajectory computation process 891 computes the circular path constant g trajectory to the assigned altitude or vertical path. In another exemplary embodiment, process 891 also computes the trajectory resulting in an overshoot of more than 250 feet. These computations may then be displayed on the primary flight display altitude tape as discussed herein. The trajectory computations may be updated every 100 msecs, or any other suitable period of time, to reflect current vertical speed.

Figure 1C:
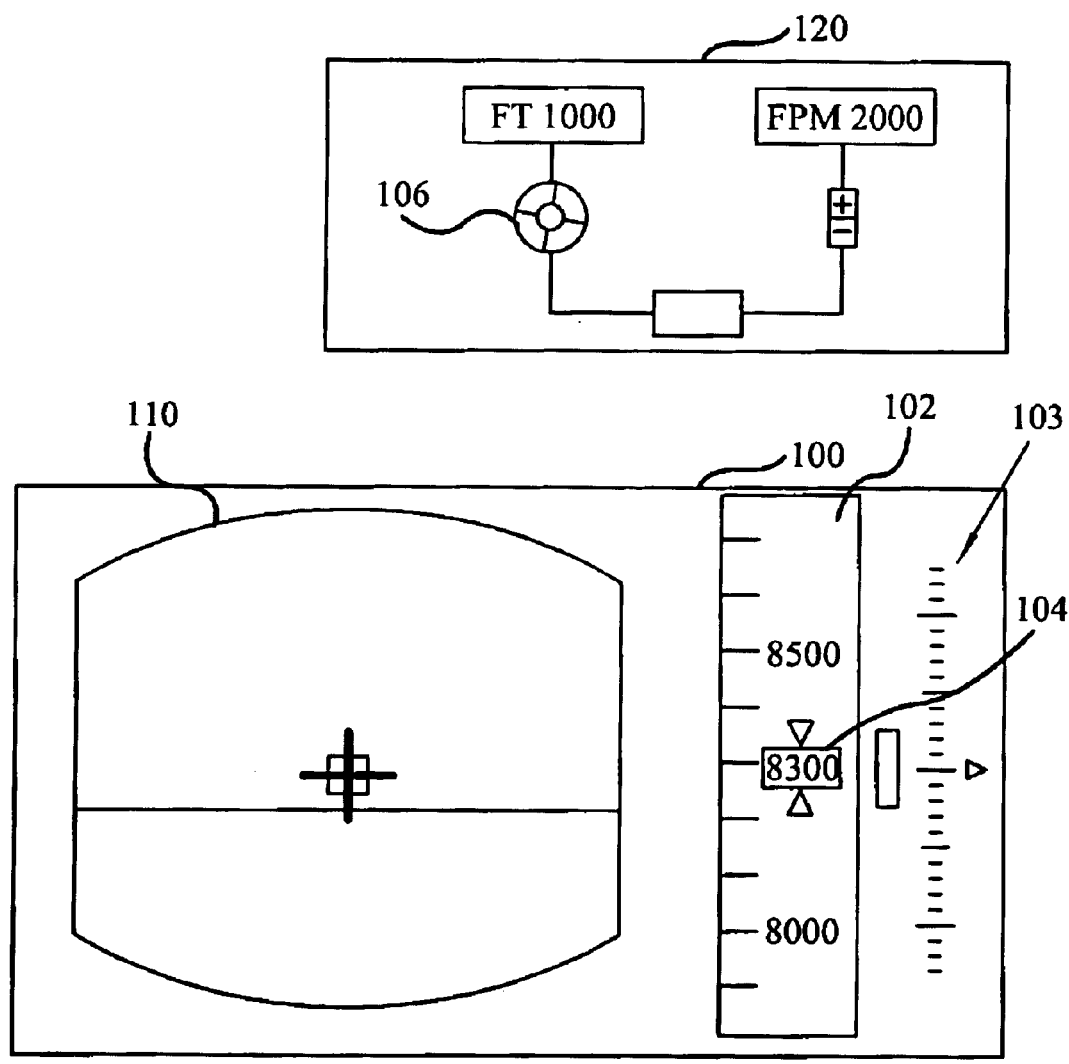
FIG. 1C is a conventional prior art cockpit graphic display illustrating various instrument readings including an altitude tape.

FIG. 1C shows an exemplary aircraft flight display 100 which provides feedback to the pilot regarding the velocity of the aircraft, altitude of the aircraft, rate of ascent/descent, heading, and other information. The flight display may be, in one embodiment, a Cathode Ray Tube, or Flat Panel display. Also shown is an exemplary mode control panel 120. With reference to FIG. 1C, a cockpit display screen suitably includes an artificial horizon display 110, a vertical rate of ascent/descent scale 103, and an altitude tape 102. Mode Control Panel 120 includes an altitude assignment knob 106. Altitude tape 102 displays to the pilot the current altitude. The current altitude is indicated by an icon 104. This icon 104 is typically located at the center of altitude tape 102 and may numerically indicate the current altitude which scrolls up or down, past icon 104, as the elevation of the aircraft changes. As the pilot is instructed by Air Traffic Control to change from one assigned elevation to another elevation, the pilot enters or dials that change into an auto pilot or other automation. This altitude change can be entered directly on the auto pilot, or by adjusting dial 106 to indicate the new assigned altitude. Alternatively, any other method of entering the new assigned altitude may be utilized, such as entering the assigned altitude through the Multi Function Control and Display Unit (MCDU) which is a part of the Flight Management System (FMS). The vertical rate of ascent/descent scale 103 indicates the vertical velocity of the plane via use of a bar graph type display.

It is important to note that the term "path" is generally used to describe an intended route from one point in space to another. The term "trajectory" is generally used to describe the actual route taken to get from one point to another. After the pilot enters a new assigned altitude, the automation suitably begins to change the pitch and thrust of the aircraft to achieve the new assigned altitude. For example, an aircraft flying at an elevation of 8300 feet, as indicated by altitude icon 104 in FIG. 1C, may be assigned to ascend to an altitude of 10,000 feet. After entering the new assigned altitude of 10,000 feet via dial 106, the automation makes thrust, pitch, or other adjustments as appropriate to begin the ascent.

Figure 2A:
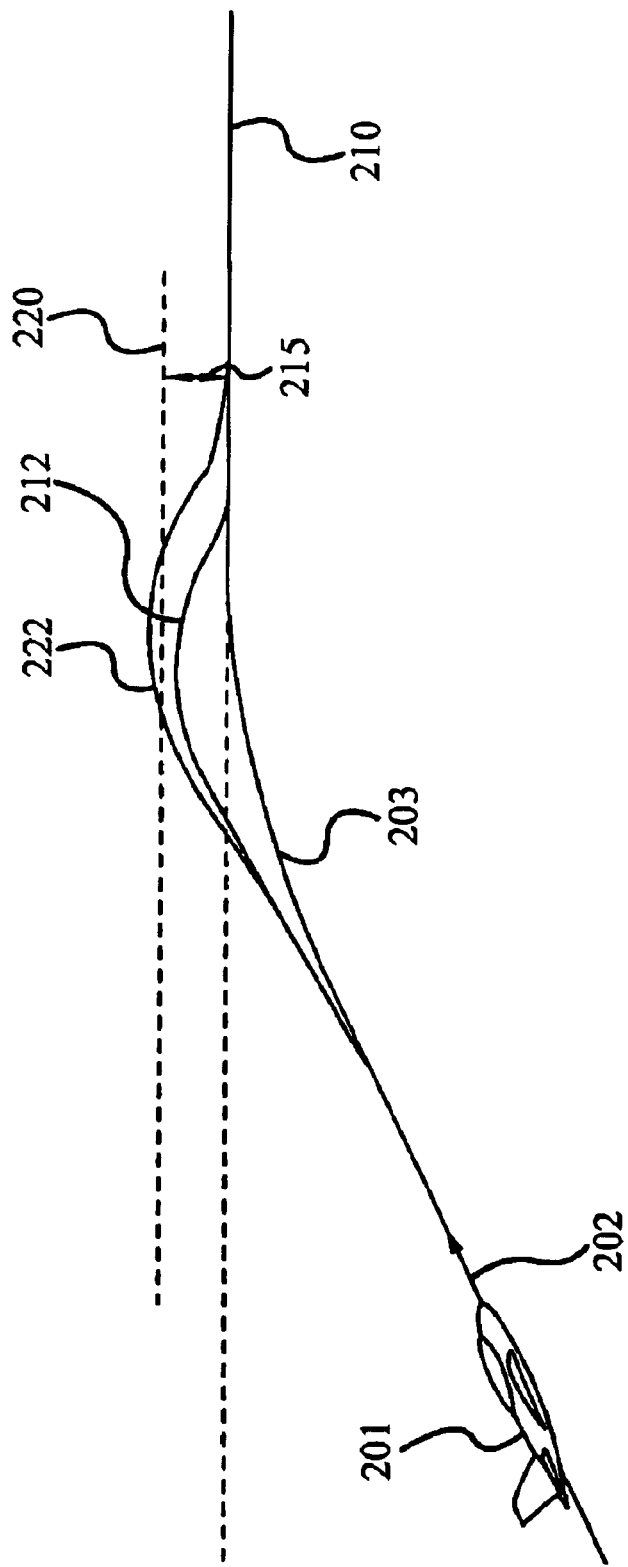
FIG. 2A is an exemplary elevation view of an aircraft ascending to an assigned elevation along multiple paths.

FIG. 2A shows several exemplary trajectories which might be followed by an aircraft capturing an assigned level altitude. With reference to FIG. 2A, aircraft 201 is shown ascending along trajectory 202 to an assigned altitude 210. At some point(s) before aircraft 201 reaches assigned altitude 210 the pilot or auto pilot adjusts the pitch and thrust of aircraft 201 to make a smooth transition, for example along trajectory 203, to assigned altitude 210. Failure to make a timely adjustment to the pitch and thrust used during the ascent portion 202 may result in an overshoot of the assigned altitude 210, for example along path 212 or 222, or may result in a rough transition from path 202 to assigned altitude 210. A maximum permissible overshoot range 215 may be defined relative to assigned altitude 210, for example, by the FAA, another regulatory agency, or the airline. The maximum permissible overshoot range 215 may be, for example, 250 feet, although any range may be set as appropriate. A maximum overshoot elevation 220 may also be defined by the assigned altitude plus the maximum permissible overshoot range which in this example would be 10,250 feet. Therefore, the overshoot indicated by path 222 would take aircraft 201 above maximum overshoot elevation 220 and would result in an altitude 'bust'.

Figure 2B:
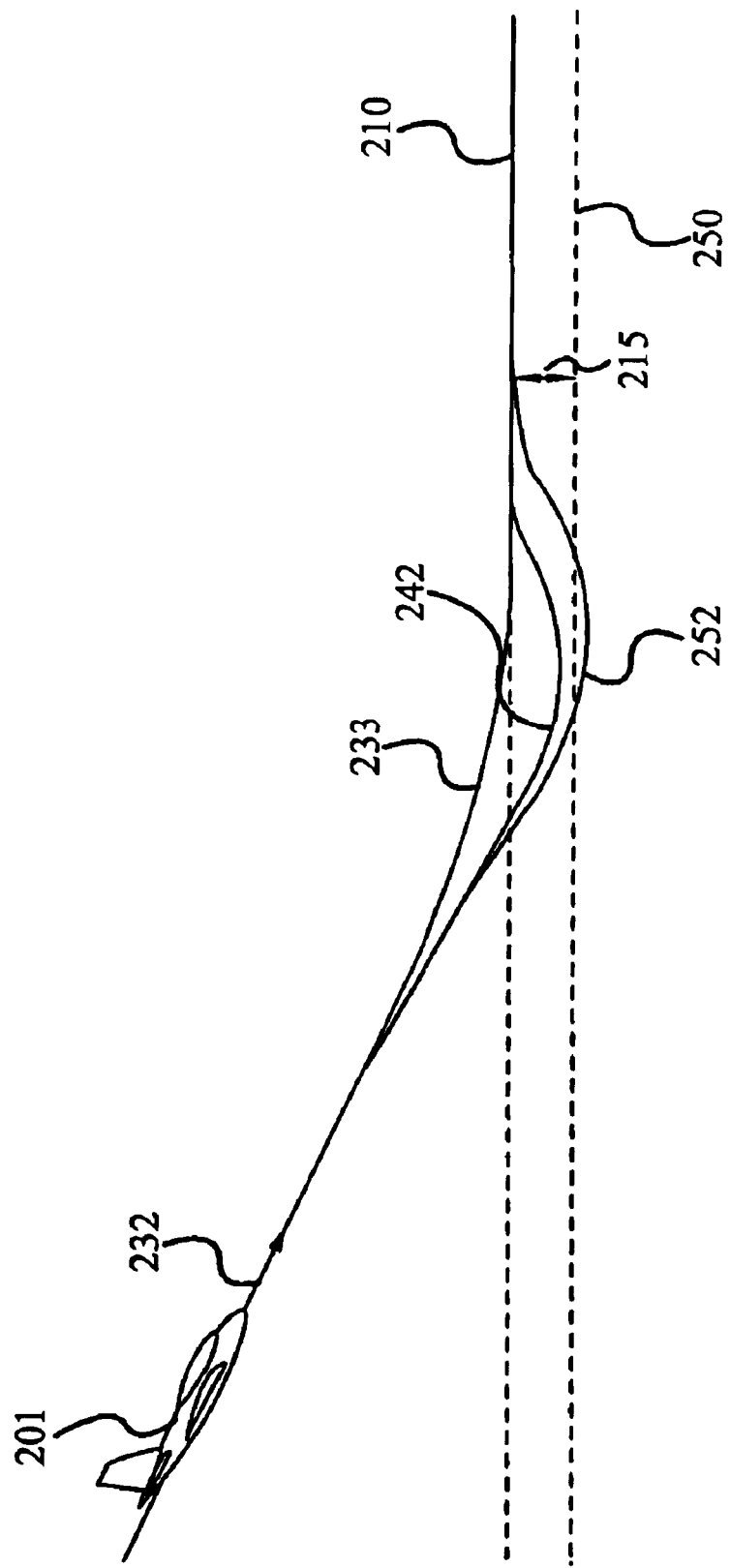
FIG. 2B is an exemplary elevation view of an aircraft descending to an assigned elevation along multiple paths.

In another example, and with reference to FIG. 2B, aircraft 201 is shown descending along trajectory 232 to an assigned altitude 210. At some point before aircraft 201 reaches assigned altitude 210 the pilot or auto pilot must adjust the pitch and thrust of aircraft 201 to make a smooth transition, for example along path 233, to assigned altitude 210. Failure to make a timely adjustment to the pitch and thrust used during the descent portion 232 may result in an overshoot of the assigned altitude 210, for example along path 242 or 252, or may result in a rough transition from path 202 to assigned elevation 210. A minimum overshoot elevation 250 may also be defined by the assigned altitude 210 minus the maximum permissible overshoot range 215. Therefore, the overshoot indicated by path 252 would take aircraft 201 below minimum overshoot elevation 250 and would result in an altitude 'bust'.

Figure 3A:
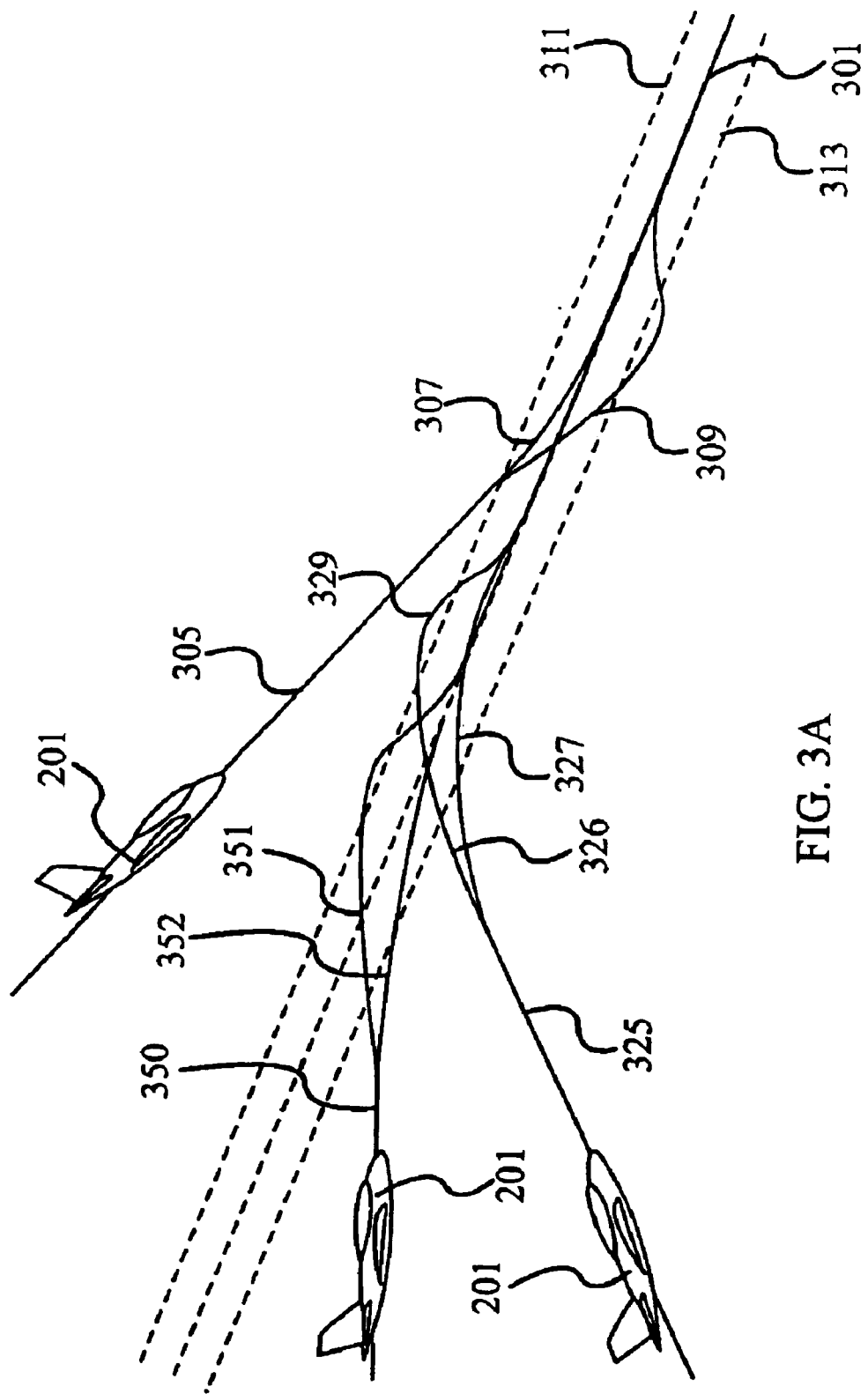
FIG. 3A is an exemplary side view of an aircraft acquiring an assigned descending vertical path.
Figure 3B:
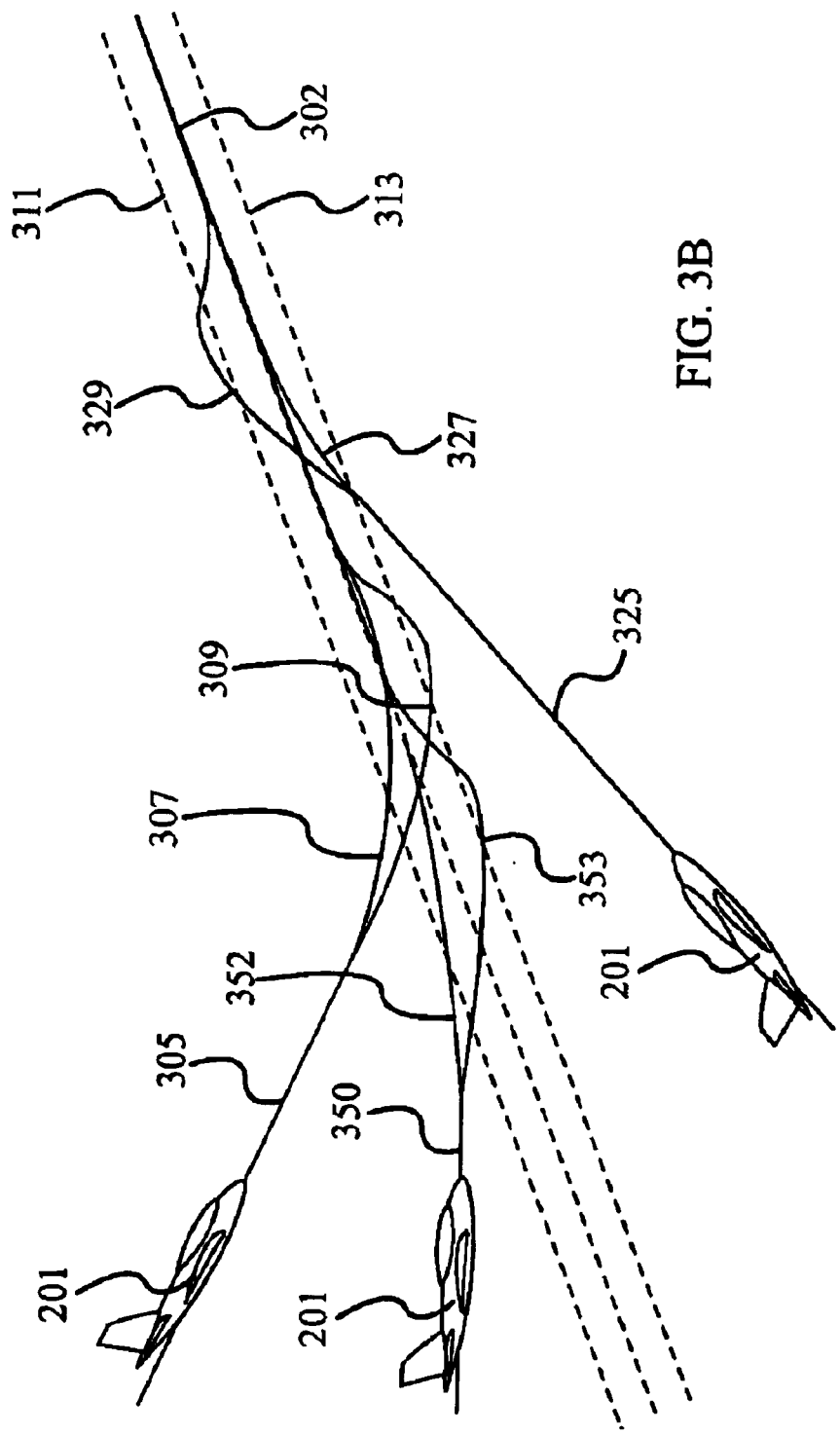
FIG. 3B is an exemplary side view of an aircraft acquiring an assigned ascending vertical path.

In a further embodiment, and with reference to FIGS. 3A and 3B, aircraft 201 may be assigned to a descending path 301 or an ascending path 302, as opposed to the level paths discussed with reference to FIGS. 2A and 2B. An overshoot or undershoot window may be defined around path 301 or 302 by adding the maximum overshoot range to each point on path 301 or 302 to get overshoot boundary 311 and by subtracting the maximum overshoot range to each point on path 301 or 302 to get overshoot boundary 313.

To acquire path 301 or 302, aircraft 201 may be instructed to ascend or descend to the paths from a different elevation. This may result in the aircraft following a first trajectory 305 or 325 and smooth transition trajectory 307 or 327. In this example, a failure to initiate capture in a timely manner might lead to overshoot along trajectory 329 or 309 (respectively), and to a breach of overshoot boundary 313 or 311. It is also anticipated that aircraft 201 may be assigned to capture paths 301 or 302 from horizontal flight along trajectory 350 and smooth transition trajectory 352, and where a failure to initiate capture in a timely manner would result in a breach of overshoot boundaries 311 or 313 along trajectories 351 or 353 respectively.

A smooth path capture might follow, for example, a circular path trajectory or constant normal acceleration (e.g., 0.03*g) adjustment. The computations used to compute the pitch control commands for capturing an assigned altitude may be made by the flight control computer, the flight management computer, or another component and may be based on non-linear equations that are difficult for human operators to estimate with rules-of-thumb or other linear techniques. Furthermore, the computations may be based on logical conditions that determine the level of constant normal acceleration required by the aircraft. Calculations may, for example, be based on the equation $$Ac = \frac{Evs \cdot |Evs|}{2 \cdot C \cdot g};$$

where Ac is the Capture Altitude, Evs is the vertical speed error, C is a Constant, and g is 32.2 ft/sec$^2$. The Capture Altitude is the altitude remaining to the assigned altitude or vertical path. The Vertical Speed Error is the difference between the desired vertical speed and the actual vertical speed. Of course, the desired vertical speed for a level altitude is zero. The Constant is the desired vertical acceleration (e.g. 0.03*g).

Figure 4:
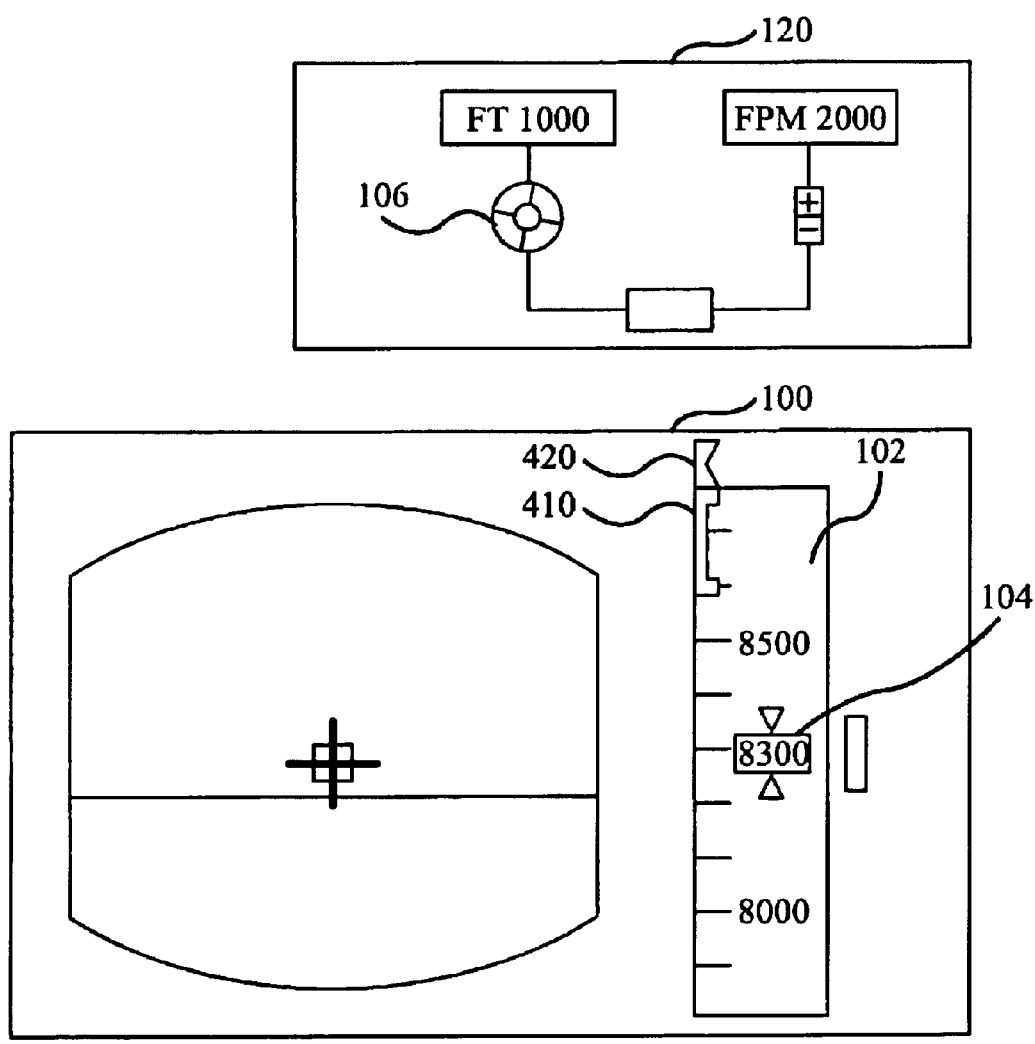
FIG. 4 is an exemplary embodiment showing a method of displaying the capture region in relation to the assigned altitude.

In the above examples, although the automation may initiate capture in a timely manner, the pilots of aircraft 201 may not always trust the accuracy of the automation and, without additional information, may make manual adjustments over-riding the automation and deviating from the smooth transition paths discussed above. It is, therefore, desirable to provide the pilots with further information via cockpit display screen 100. FIG. 4 is view of an exemplary cockpit display screen 100. In one embodiment a capture icon 410 is displayed on altitude tape 102 on cockpit display screen 100. Capture icon 410 provides the pilot with information such as the first point to initiate capture, last point to initiate capture, and capture trajectory in the manner described more fully below. In a further embodiment, one or more "off tape" indicators 420 may be displayed to inform the pilot that further information would be shown if the tape were larger and that as the tape scrolls to higher (or lower) elevations, that this information will be displayed. Off tape indicators 420 may also be located below altitude tape 102 or in other locations as appropriate.

Figure 5A:
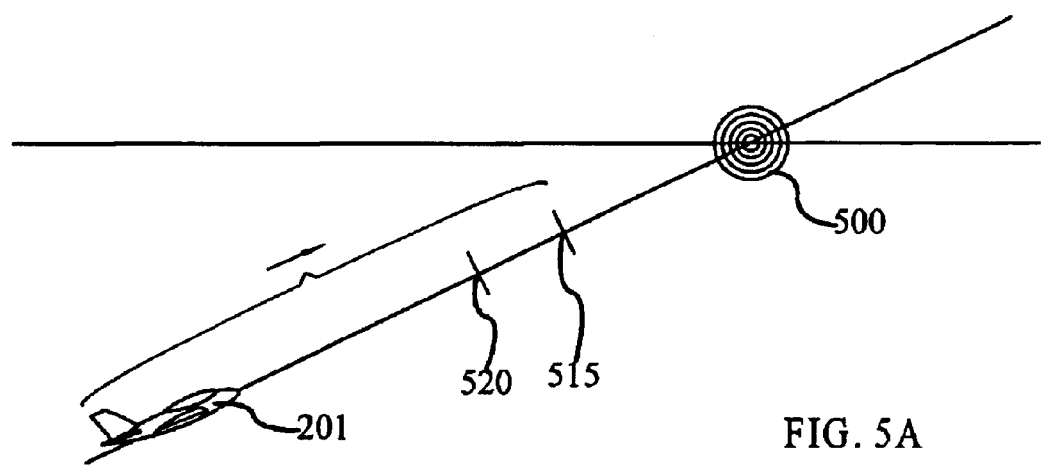
Figure 5B:
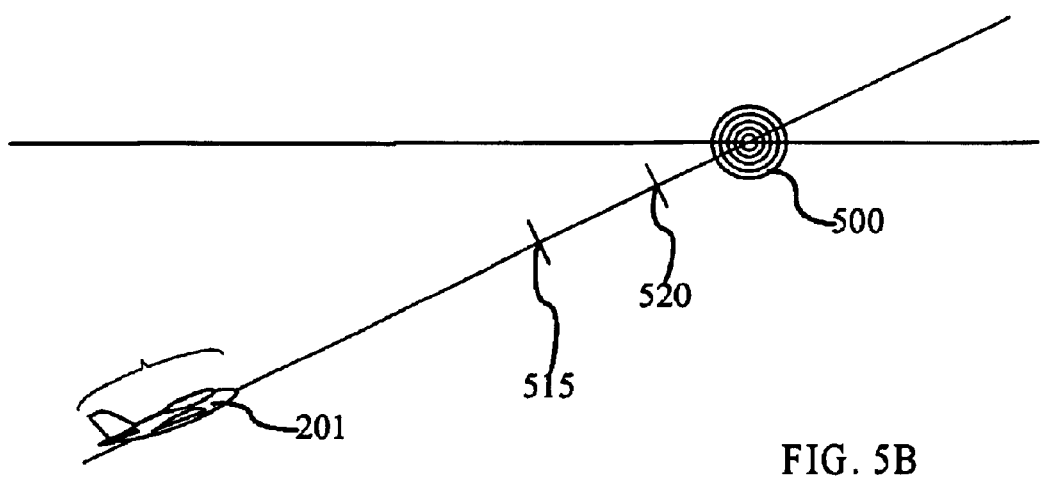

FIGS. 5A and 5B show elevation views of an aircraft acquiring an assigned altitude 500. Capture information alerts the pilot to the proper point 515 to initiate capture. In one embodiment, the proper point may be calculated to create a smooth transition to the assigned altitude. In other embodiments, a variety of inputs could be considered to calculate the safest or most fuel efficient transition, or a combination of these results. In other embodiments capture information may also alert the pilot as to the last possible point 520 to initiate capture safely without an altitude bust. Points 515 and 520 may not be static points, but rather may be adjusted and updated as the plane changes altitude and vertical velocity, and therefore, provide real time capture information to the pilot. Points 515 and 520 may be, in one embodiment, calculated points at a distance relative to aircraft 201 and from the frame of reference of aircraft 201 as shown in FIG. 5A. In this exemplary embodiment, the pilot is informed that aircraft 201 should initiate capture when point 515 reaches target 500, and no later than when point 520 reaches target 500 to avoid an altitude bust. In another embodiment, shown in FIG. 5B, aircraft 201 may be thought of as ascending towards static points 515 and 520 as aircraft 201 acquires target altitude 500. In this embodiment, capture should be initiated when aircraft 201 reaches point 515 and no later than when aircraft 201 reaches point 520 in order to capture target 500 without an altitude bust. Technically speaking, points 515 and 520 are computed above the aircraft as opposed to ahead of the aircraft. FIG. 5C shows another conceptual drawing of an exemplary embodiment where the calculated distance to the first 515 and last 520 capture initiation points are shown above the aircraft at various stages of ascent. In this embodiment, an aircraft 201 ascending at the stage referenced by 571 may be well below the first point where capture initiation should begin, may be the capture initiation point at 572, may be at the last point to initiate capture at 573, and may "bust" if capture has not begun if in the position referenced by 574.

Figure 6A:
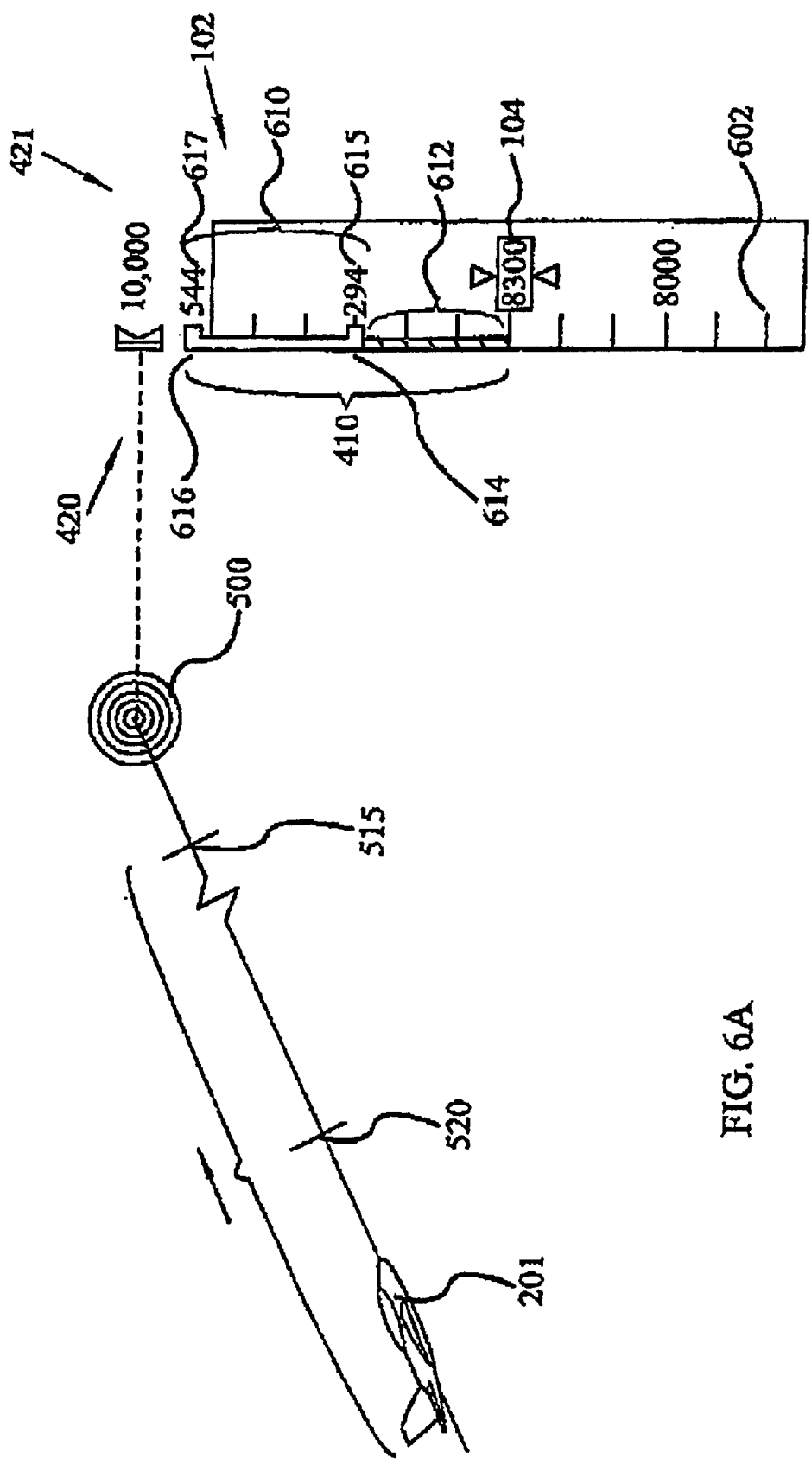
FIG. 6A is an exemplary embodiment showing one method of displaying the capture region in relation to the assigned altitude and current altitude.

With reference FIG. 6A, a more detailed view of altitude tape 102 is shown in relation to the elevation view of FIG. 5A, and an exemplary embodiment is described. A capture icon 410 is displayed on altitude tape 102 from the aircraft's frame of reference. The current altitude of aircraft 201 is displayed in box 104 which may remain vertically centered on altitude tape 102 while the current elevation of aircraft 201 scrolls past current altitude box 104. Tick marks 602 may be spaced, for example, at 100 foot intervals. An assigned or target altitude value indicator 421 is shown near assigned altitude icon 420. In FIG. 6A, for example, the assigned altitude is shown to be 10,000 feet.

A capture icon 410 is displayed which may include a capture region 610 and overshoot region 612. Capture region 610, in one embodiment, resembles a bracket. where the end of the bracket nearest the current altitude 614 represents the last point to start capture and where the other end of the bracket 616 represents the first point to start capture. Relative distance indicators 615 and 617 may be provided near bracket ends 614 and 616. It should be noted that, in the depicted embodiment, the relative distances represented by the bracket ends 614 and 616, and indicated on the relative distance indicators 615 and 617, respectively, are calculated relative to the aircraft, and from the frame of reference of the aircraft, as was described above and depicted in FIG. 5A. Thus, in FIG. 6A, the first point to initiate capture 515 corresponds to bracket end 616, and the last point to initiate capture 520 corresponds to bracket end 614. This indicates to the pilot that aircraft 201 should initiate capture when bracket end 616 reaches the target altitude icon 420, and no later than when bracket end 614 reaches target altitude icon 420. It should additionally be noted that the first and last points to initiate capture and their associated relative distance indicators may be constantly or periodically recalculated and may depend on the current vertical ascent/descent rate, among other factors. During a maneuver to a different elevation, the vertical rate may first increase, then remain constant, and then decrease back to zero as the assigned elevation is attained. Therefore, the relative distance indicators (615 and 617) may change many times.

As an example, assuming that an aircraft is climbing at 1500 feet per minute, relative distance indicator 617 indicates to the pilot that the first point to initiate capture is, 544 feet above the current altitude of the aircraft. Also, given the same assumption, relative distance indicator 615 indicates to the pilot that the last point to initiate capture without an altitude bust occurs 294 feet above the current altitude of the aircraft. Bracket ends 614 and 616 may be shown at relative distances to current altitude marker 104 as a graphical representation of the relative distance indicator values. If any part of capture region 610 is far enough away from current altitude indicator 104 that it can not be shown on altitude tape 102, this condition may be indicated on a off-tape capture region indicator 616 located, for example, just above (or below) altitude tape 102.

An assigned altitude icon 420 may also be provided together with assigned altitude value indicator 421. Both of these may indicate to the pilot the assigned altitude, both may be parked above (or below) tape 102 as shown in FIG. 6A, and both may move on altitude tape 102 within the "displayable" range. Overshoot range 612 may be provided as appropriate between last point to start capture bracket end 614 and the current altitude icon 104. It is possible, however, that conditions could be present where no last point to initiate capture exists (i.e., when relative distance indicator 615 is equal to zero) and therefore no overshoot region would exist. For example, at vertical speed rates of less than 300 feet per minute, it is generally possible to capture an assigned altitude regardless of the remaining distance to the assigned altitude. The capture information discussed herein and displayed on altitude tape 102 makes apparent to a pilot that aircraft 201 is following a proper capture trajectory when the assigned altitude bug enters the capture region and in particular when it is not in the overshoot region.

Figure 6B:
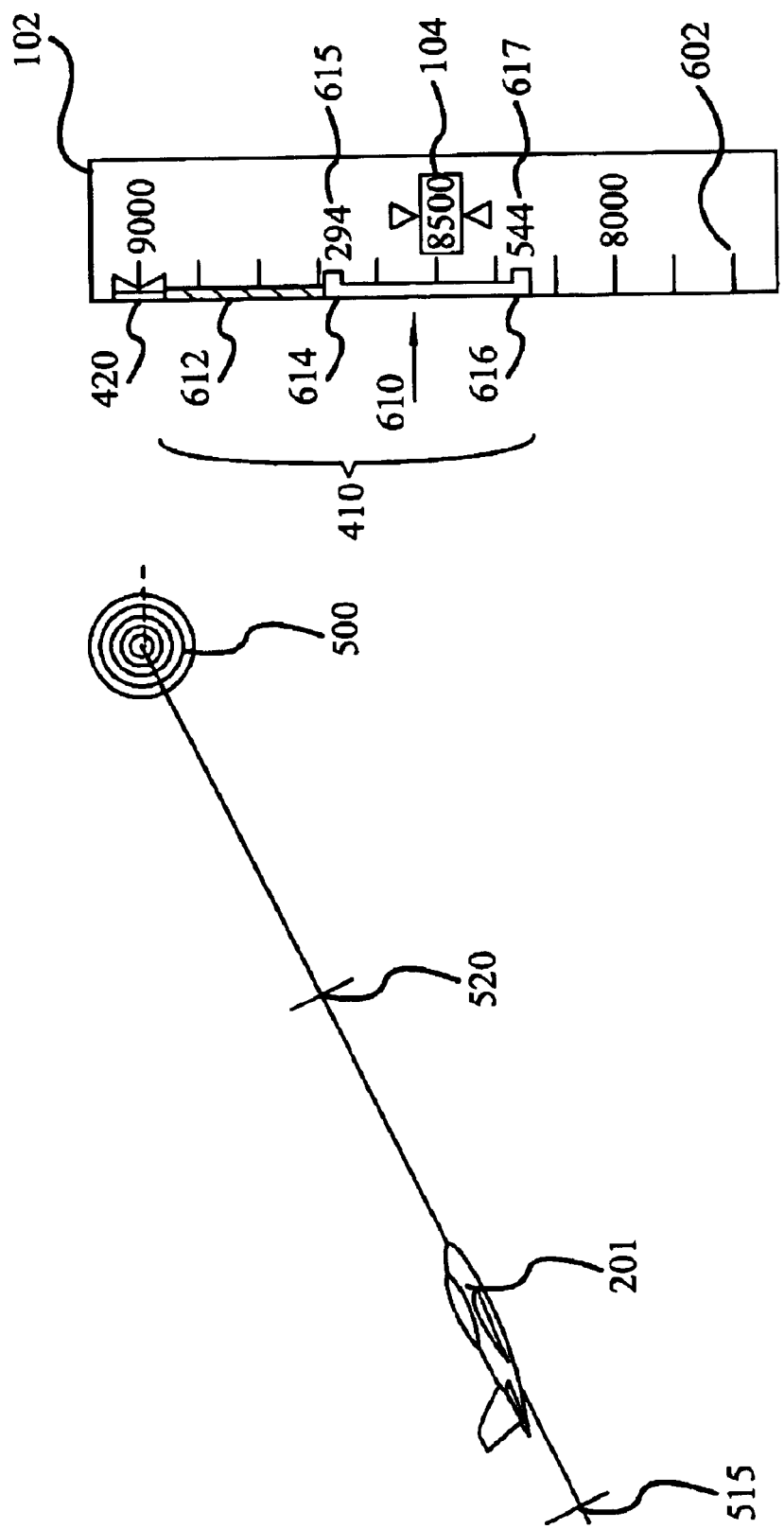
FIG. 6B is an exemplary embodiment showing another method of displaying the capture region in relation to the assigned altitude and current altitude.

With reference to FIG. 6B, it is also possible to display information on altitude tape 102 with the frame of reference being the target altitude as discussed with reference to FIG. 5B. Operation in this reference frame is similar to that described above, however, capture icon 410 is displayed to the pilot relative to assigned altitude icon 420 as opposed to being displayed relative to current altitude box 104. Also, in this embodiment, the first point to initiate capture bracket 616 and relative distance indicator 617, and the last point to initiate capture bracket 614 and relative distance indicator 615 may be shown relative to assigned altitude icon 420.

As an example, assuming that an aircraft is climbing at 1500 feet per minute, relative distance indicator 617 indicates to a pilot that the first point to initiate capture is, 544 feet below the 10,000 foot assigned altitude. Also, in an aircraft climbing at 1500 feet per minute, relative distance indicator 615 indicates to a pilot that the last point to initiate capture without an altitude bust is 294 feet below the 10,000 foot assigned altitude. Therefore, if aircraft 201 is ascending to 10,000 feet at a vertical speed of 1500 feet per minute, the last point to initiate capture may be the 9,706 foot level.

It should be noted that in the exemplary embodiments described herein, exemplary values are provided for elevations, velocities, distances, and similar numbers representing physical conditions and calculated values. These values are provided for example purposes, but it should be clear that other values may be calculated in accordance with known algorithms used to calculate such information as velocity, elevation, pitch, thrust, and similar values.

Figures 7A, 7B:
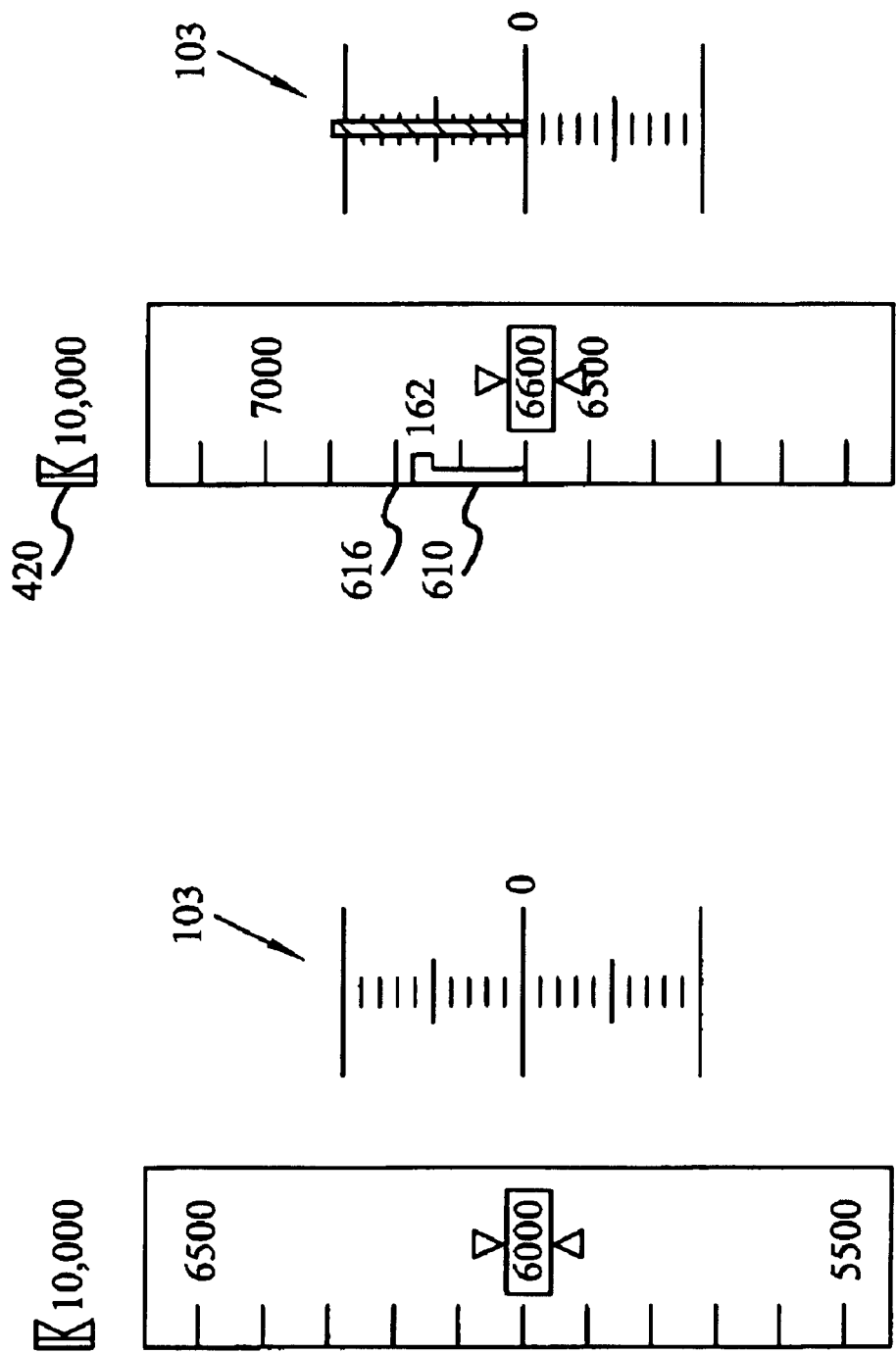
FIGS. 7A–7F are an exemplary embodiment of an altitude tape as shown in various steps during the acquisition of an assigned altitude.
Figure 7D:
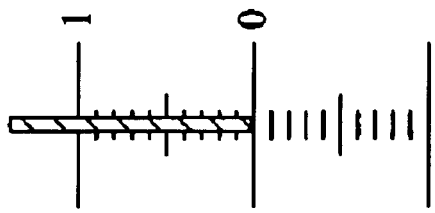
Figure 7D:
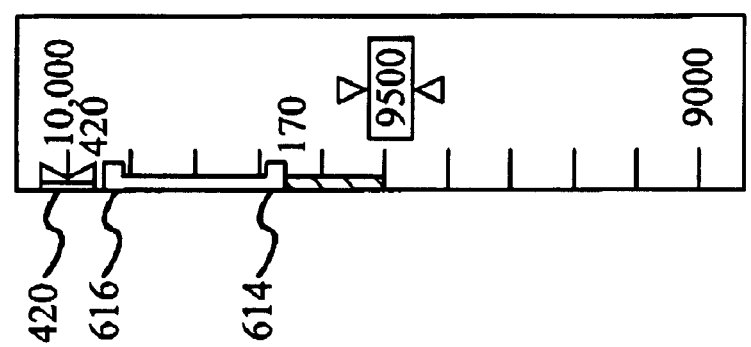
Figure 7C:
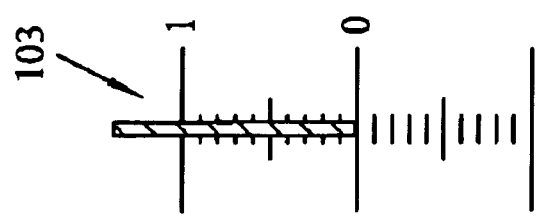
Figure 7C:
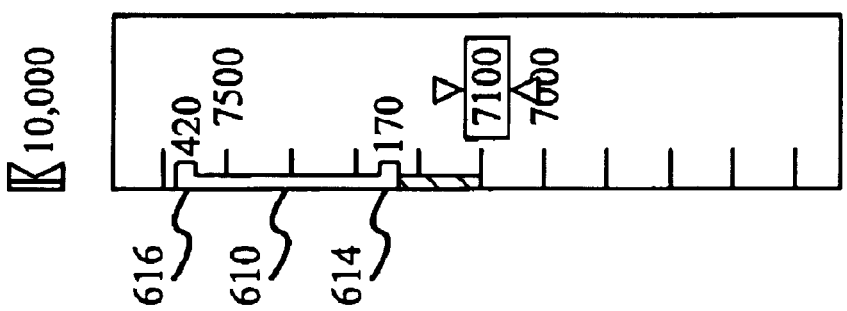

To describe another example, and with reference to FIG. 7A, Air Traffic Control may instruct an aircraft 201 to ascend from an initial altitude of 6000 feet to an assigned altitude of 10,000 feet. If aircraft 201 is initially flying a level path, vertical velocity scale 103 registers zero. As aircraft 201 increases its pitch and thrust to climb at 1100 feet per minute, for example, vertical velocity scale 103 may appear as in FIG. 7B. Assigned altitude icon 420 remains parked off scale, and capture region icon 610 indicates that the first point to initiate capture 616 is 162 feet above the current altitude of the aircraft. As aircraft 201 continues its ascent in FIG. 7C and the vertical climb rate is further increased as displayed on vertical velocity scale 103. Capture region icon 610 suitably indicates that the first point to initiate capture 616 is now 420 feet above the current altitude of the aircraft, and the last point to initiate capture 614 is 170 feet above the current altitude of the aircraft. One reason for the increased distance in first point 616, and the appearance of last point 614 is that the vertical ascent rate has increased. In FIG. 7D, aircraft 201 continues to climb at the same rate as discussed with regard to FIG. 7C and therefore, the first point 616 and last point 614 remain constant. The assigned altitude icon 420, however, has now entered into the displayable region of altitude tape 102.

Figure 7F:
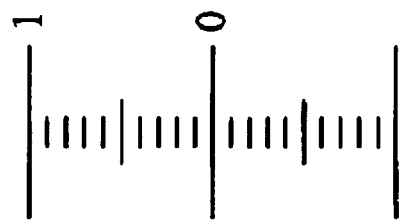
Figure 7F:
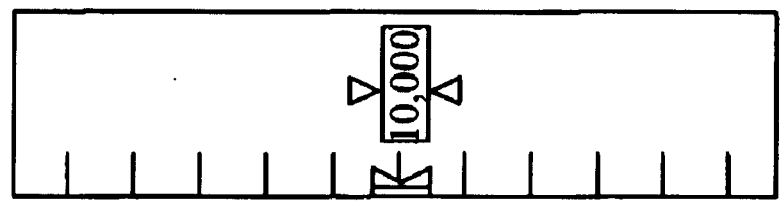
Figure 7E:
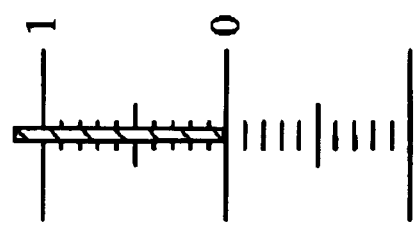
Figure 7E:
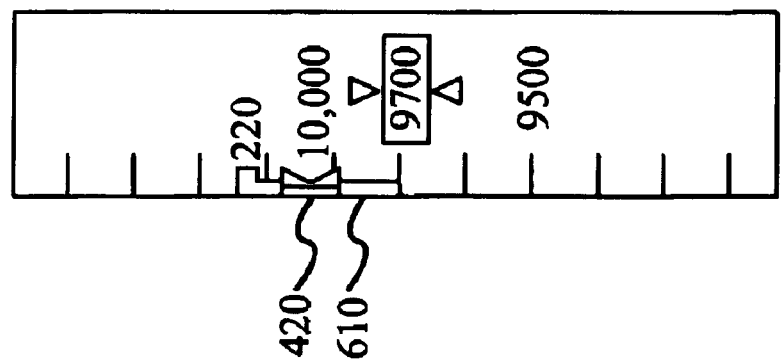

As, the aircraft automation initiates capture and begins to slow the rate of ascent, thus decreasing the size of the capture region 610 shown in FIG. 7E decreases keeping assigned altitude icon 420 just within capture region icon 610 to reflect that capture has been initiated. Finally, the assigned altitude is captured, FIG. 7F, and the vertical ascent speed returns to zero, the assigned altitude icon 420 is displayed at the same position as current altitude icon 104, and the capture region indicators disappear.

In some embodiments, the automation is configured so as to not allow the assigned altitude icon to enter into the overshoot region. This may be accomplished, for example, by creating software limiting rules in the auto-pilot or FMS. If a pilot entered an assigned altitude during an ascent phase to a previously assigned altitude, however, the auto pilot could suddenly find itself in the overshoot region and then alert the pilot to this situation by displaying the assigned altitude icon in the same region as the overshoot icon. In like fashion, if a pilot failed to initiate capture soon enough during an ascent to an assigned altitude in manual mode, the assigned altitude icon would be shown in the overshoot region. The presence in the overshoot region could be displayed regardless of whether the pilot is on manual control or on auto pilot control.

Although much of the discussion has focused on examples where aircraft 201 is ascending to an assigned altitude, similar operation is provided for an aircraft assigned to a lower altitude, for an aircraft assigned to ascending or descending paths, and for embodiments showing capture region information relative to the assigned altitude, rather than relative to the aircraft or the present aircraft altitude. An example of an aircraft assigned to a lower altitude, and in accordance with an embodiment in which capture region information is displayed relative to the assigned lower altitude will now be described.

Figure 8D:
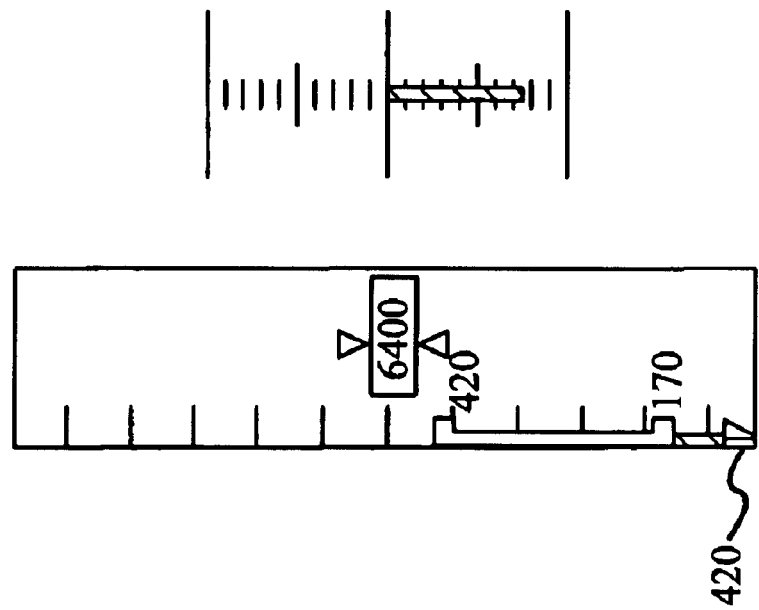
Figure 8C:
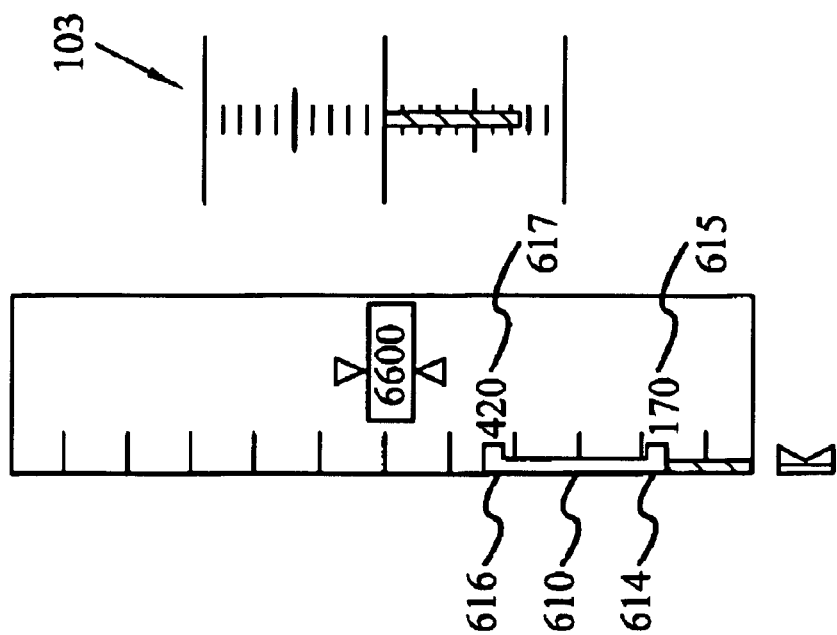

With reference to FIG. 8A, an aircraft may be assigned from an initial altitude of 10,000 feet to an assigned altitude of 6000 feet. If aircraft 201 is initially flying a level path, vertical velocity scale 103 registers zero, as shown in FIG. 8A. As aircraft 201 changes its pitch and thrust to descend at 1100 feet per minute, for example, vertical velocity scale 103 may read as shown in FIG. 8B. Assigned altitude icon 420 remains parked off scale, and capture region icon 610 indicates that the first point to initiate capture 616 is 162 feet above the 6,000 foot level. As aircraft 201 continues its descent (shown in FIG. 8C), the rate of descent is further increased as displayed on the vertical velocity scale 103. Capture region icon 610 indicates that the first point to initiate capture 616 is now 420 feet above the 6,000 foot level, and the last point to initiate capture 614 is 170 feet above the 6,000 foot level. One reason for the increased distance in first point 616, and the appearance of last point 614 is that the vertical descent rate has increased relative to that shown in FIG. 8B. In FIG. 8D, aircraft 201 continues to descend at the same rate as discussed with regard to FIG. 8C and therefore, the first point 616 and last point 614 remain constant. But the assigned altitude icon 420 has now entered into the displayable region of altitude tape 102.

As the first point to initiate capture scrolls past the current altitude icon 104, the automation initiates capture and begins to slow the rate of ascent, thus decreasing the size of the capture region as shown in FIG. 8E and keeping assigned altitude icon 420 just within capture region icon 610. Finally, the assigned altitude is captured, FIG. 8F, and the vertical ascent speed returns to zero, the assigned altitude icon 420 is at the current altitude icon 104, and the capture region indicators disappear. In the embodiment where the capture region is displayed relative to an assigned altitude, the aircraft 201 is known to be following a capture trajectory when the current altitude box 104 enters and stays within the capture region.

Figure 9:
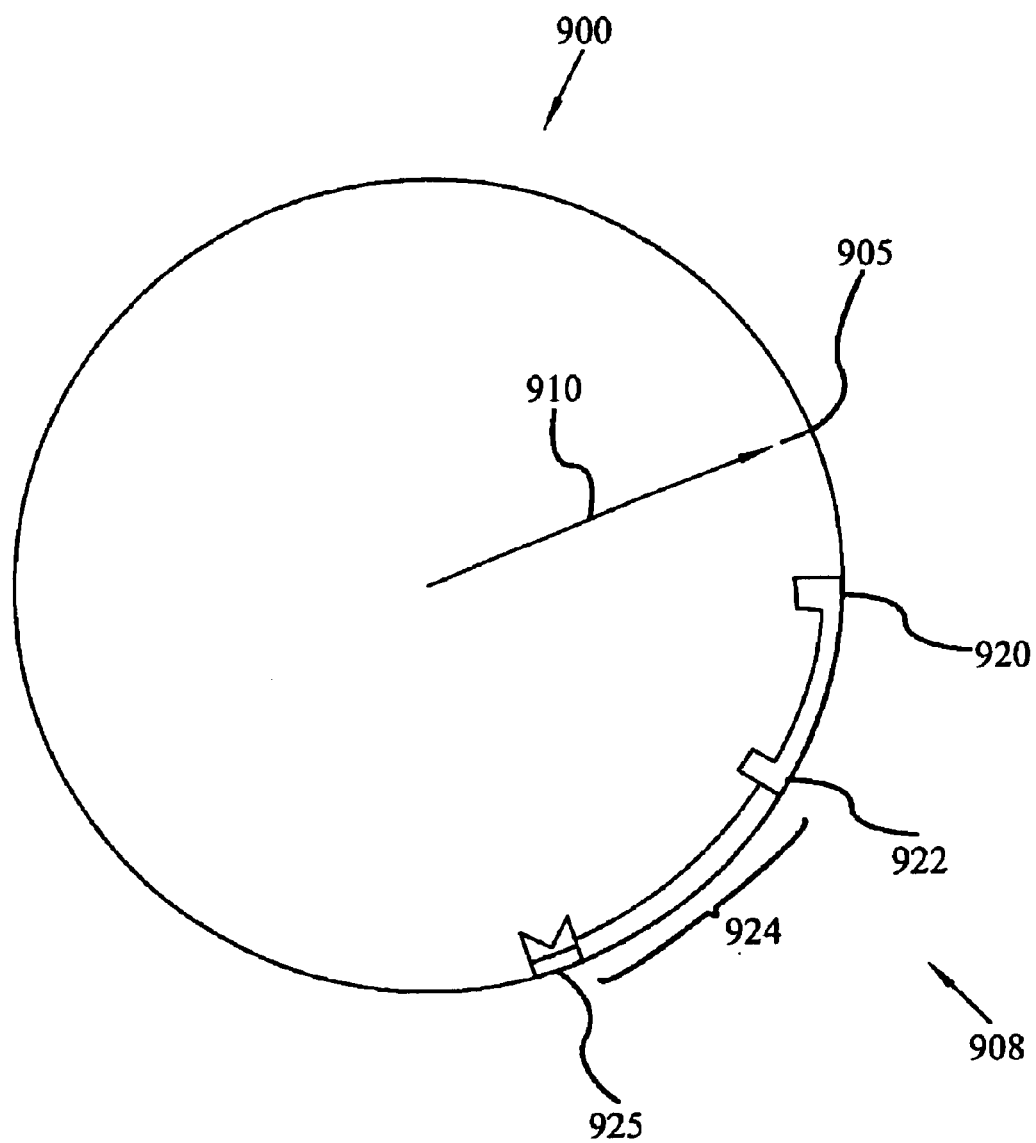
FIG. 9 is an alternative embodiment of the present invention showing a dial gauge.

Although the present discussion is described in the context of an altitude tape display, any visual display that shows a pilot the first and last points to initiate capture is within the scope of this invention. For example, FIG. 9 shows an alternative exemplary embodiment where a dial type altitude gauge is displayed on a computer monitor on a cockpit display. This dial type altitude gauge may include icons for displaying capture information. In such an embodiment, a needle 910 on a gauge 900 points to the current altitude 905. Needle 910 may rotate, or alternatively the altitudes could rotate past a stationary needle 910. Capture icon 908 may be suitably displayed with a first point to initiate capture 920, last point to initiate capture 922, an overshoot range 924, and an icon representing the assigned altitude 925. This embodiment operates with the same principles described in greater detail with regards to the altitude tape embodiment described herein.

The corresponding structures, materials, acts and equivalents of all elements in the claims below are intended to include any structure, material or acts for performing the functions in combination with other claimed elements as specifically claimed. The scope of the invention should be determined by the appended claims and their legal equivalence, rather than by the examples given above. No element described herein is necessary to the practice of the invention unless expressly described as "critical" or "essential". The various steps in the following method claims may be practiced in any order, and are not required to be practiced in the order recited below.

What is claimed is:

1. A method for providing information to a pilot of a vehicle via a display, the method comprising the steps of:
    a) indicating a current position of said vehicle on said display;
    b) receiving a target position for said vehicle;
    c) determining a first capture initiation position, said first capture initiation position differing from said current position and corresponding to a point for said vehicle to initiate capture in order to obtain said target position from said current position;
    d) receiving a maximum permissible overshoot;
    e) determining a last capture initiation position such that said target position to be captured will be overshot by no more than said maximum permissible overshoot, wherein the region between said first capture initiation position and said last capture initiation position forms a capture region; and
    f) displaying (i) said first capture initiation position on said display in conjunction with said current position of said vehicle and (ii) said capture region relative to said current vehicle position.

2. The method of claim 1 wherein said first capture attribute is determined and displayed relative to said current attribute.

3. The method of claim 1 wherein said first capture attribute is determined and displayed relative to said target attribute.

4. The method of claim 1 further comprising the steps of: a) computing a trajectory to said target attribute; and b) displaying said trajectory relative to said current attribute of said vehicle.

5. The method of claim 1 further comprising the steps of: a) computing an overshoot region within which initiation of capture will result in overshoot of said target position to be captured by more than said maximum permissible overshoot; and b) displaying said overshoot region relative to said target position to be captured.

6. The method of claim 1 further comprising the steps of: a) computing an overshoot region within which initiation of capture will result in overshoot of said target position to be captured by more than said maximum permissible overshoot; and b) displaying said overshoot region relative to said target position to be captured.

7. The method of claim 5 wherein said target position is a path.

8. The method of claim 7 wherein said position indicator is an altitude indicator, said current vehicle position is a current vehicle altitude, said first capture initiation position is a first capture initiation altitude, said last capture initiation position is a last capture initiation altitude, and said path is an increasing altitude path.

9. The method of claim 7 wherein said position indicator is an altitude indicator, said current vehicle position is a current vehicle altitude, said target position is a target altitude, said first capture initiation position is a first capture initiation altitude, said last capture initiation position is a last capture initiation altitude, and said path is a decreasing altitude path.

10. The method of claim 5 wherein said position indicator is an altitude indicator, said current vehicle position is a current vehicle altitude, said target position is a target altitude, said first capture initiation position is a first capture initiation altitude, said last capture initiation position is a last capture initiation altitude, and said target position is an assigned altitude.

11. The method of claim 10 wherein said first capture initiation altitude is a function of vertical speed error and is proportional to $$\frac{Evs \cdot |Evs|}{2 \cdot C \cdot g}.$$

12. The method of claim 10 wherein said vehicle is an aircraft.

13. The method of claim 10 wherein the altitude indicator is an altitude tape.

14. The method of claim 10 wherein the permissible overshoot is 250 feet.

15. A digital storage medium having instructions stored thereon configured to execute the method of claim 10.

16. A digital storage medium having instructions stored thereon configured to execute the method of claim 1.

17. A method for providing feedback comprising the steps of:
   a) providing an automated control system;
   b) providing an altitude tape;
   a) providing a target altitude;
   d) displaying on said altitude tape a current aircraft altitude;
   e) displaying on said altitude tape a target indicator representing said target altitude; and
   f) displaying on maid altitude tape a path capture trajectory relative to said current aircraft altitude and corresponding to said target altitude indicator, said path capture trajectory including at least a first capture initiation altitude that differs from said current aircraft altitude,
   wherein said path capture trajectory is determined by said automated control system.

18. The method of claim 17 wherein said automated control system is an auto-pilot system.

19. The method of claim 18 wherein said target altitude is a constant altitude.

20. The method of claim 18 wherein said target altitude is defined by a path of ascending altitude.

21. The method of claim 18 wherein said target altitude is defined by a path of descending altitude.

22. The method of claim 18 wherein said target altitude is defined by a path computed as a function of vertical speed error.

23. The method of claim 17 wherein the target indicator is a first icon, the current aircraft altitude is displayed by a second icon, and the path capture trajectory is displayed by a third icon.

24. The method of claim 17 wherein the display screen is located in an aircraft.

25. A display for an aircraft comprising:
   a sliding scale altitude indicator;
   a target altitude indicator on maid sliding scale altitude indicator configured to display a target altitude;
   a current altitude indicator on said sliding scale altitude indicator configured to display a current aircraft altitude;
   a capture region indicator on said on said sliding scale altitude indicator, said capture region indicator indicating at least an altitude, different from said current aircraft altitude, for initiating a capture of said target altitude; and
   an overshoot region indicator on said sliding scale altitude indicator.

26. The display of claim 25 wherein said target altitude indicator is displayed relative to said current altitude indicator and represents an assigned altitude.

27. The display of claim 25 wherein said capture region indicator it displayed relative to said current altitude indicator and indicates the first and last points for initiating capture.

28. The display of claim 25 wherein said capture region indicator is displayed relative to said target altitude indicator and indicates the first and last points for initiating capture.

29. The display of claim 25 wherein said overshoot region indicator is displayed relative to said current altitude indicator and indicates a permissible range of overshoot.

30. The display of claim 25 wherein said overshoot region indicator is displayed relative to said target altitude indicator and indicates a permissible range of overshoot.

31. The display of claim 25 wherein said sliding scale altitude indicator is an altitude tape.

* * * * *